(12) United States Patent
Upadhyay

(10) Patent No.: US 11,792,201 B2
(45) Date of Patent: Oct. 17, 2023

(54) SYSTEM AND METHOD TO MANAGE MULTIPLE-ACCOUNT ACCESS USING A MASTER KEY

(71) Applicant: Gaurav Upadhyay, Hyderabad (IN)

(72) Inventor: Gaurav Upadhyay, Hyderabad (IN)

(73) Assignee: Gaurav Upadhyay

( * ) Notice: Subject to any disclaimer, the term of this patent is extended or adjusted under 35 U.S.C. 154(b) by 0 days.

(21) Appl. No.: 17/269,272

(22) PCT Filed: Jan. 13, 2021

(86) PCT No.: PCT/IB2021/050204
§ 371 (c)(1),
(2) Date: Feb. 18, 2021

(87) PCT Pub. No.: WO2021/165753
PCT Pub. Date: Aug. 26, 2021

(65) Prior Publication Data
US 2022/0407859 A1 Dec. 22, 2022

(30) Foreign Application Priority Data

Feb. 20, 2020 (IN) .............................. 202041007349
Jan. 13, 2021 (WO) .................. PCT/IB2021/050204

(51) Int. Cl.
*H04L 9/40* (2022.01)
(52) U.S. Cl.
CPC .......... *H04L 63/102* (2013.01); *H04L 63/064* (2013.01); *H04L 63/083* (2013.01)
(58) Field of Classification Search
CPC ... H04L 63/102; H04L 63/064; H04L 63/083; G06F 21/45; G06F 21/31; G06F 21/46

USPC ............................................................ 726/6
See application file for complete search history.

(56) References Cited

U.S. PATENT DOCUMENTS

| | | | |
|---|---|---|---|
| 6,141,760 A | 10/2000 | Abadi et al. | |
| 6,182,229 B1 | 1/2001 | Nielsen | |
| 8,331,567 B2 | 12/2012 | Yao | |
| 11,138,308 B2 * | 10/2021 | Sreeram | H04L 9/0866 |

(Continued)

OTHER PUBLICATIONS

The Mobile Phone as a Multi OTP Device Using Trusted Computing, Alzomai et al, Sep. 2010 (Year: 2010).*

(Continued)

*Primary Examiner* — Jahangir Kabir
(74) *Attorney, Agent, or Firm* — Jason C. Cameron

(57) ABSTRACT

A system to manage multiple-account access using a master key is disclosed. The system includes a master key obtaining subsystem to obtain a master key encoded in a predefined format; a child key generation subsystem to generate one or more child keys corresponding to one or more accounts associated with a user from the master key using a parent-child relationship function; a password generation subsystem to generate one or more passwords regenerative in nature corresponding to the one or more child keys by using a transformation function; a credential association subsystem to associate the one or more passwords with one or more user identifiers corresponding to the one or more accounts; a credential management subsystem to access each of the one or more accounts by using each corresponding the one or more passwords and each corresponding the one or more user identifiers.

8 Claims, 7 Drawing Sheets

(56) References Cited

U.S. PATENT DOCUMENTS

2003/0005299 A1 1/2003 Xia et al.
2008/0288778 A1* 11/2008 Skorve .................. H04L 63/123
                                                         713/176

OTHER PUBLICATIONS

J. Alex Halderman, Brent Waters, Edward W. Felten; A convenient method for securely managing passwords;https://dl.acm.org/doi/10.1145/1060745.1060815; Published on May 2005.

* cited by examiner

SYSTEM AND METHOD TO MANAGE MULTIPLE-ACCOUNT ACCESS USING A MASTER KEY

EARLIEST PRIORITY DATE

This National Phase application claims priority from a Complete patent application filed in India having Patent Application No. 202041007349 filed on Feb. 20, 2020 and titled "SYSTEM AND METHOD TO MANAGE MULTIPLE ACCOUNT ACCESS USING A MASTER KEY" and PCT Application No. PCT/IB2021/050204 filed on Jan. 13, 2021, titled "SYSTEM AND METHOD TO MANAGE MULTIPLE-ACCOUNT ACCESS USING A MASTER KEY"

BACKGROUND

Embodiments of the present disclosure relate to an account management system and more particularly to a system and a method to manage multiple-account access using a master key.

Credentials refer to verification of identity or tools for authentication. The credentials are most commonly used for user authentication wherein, the user, generally, needs to enter the credentials such as a password and a username. Generally, the credentials associated with the user are managed by a credential management system (CMS) to control access to sensitive data or organisations. Several challenges are associated with the management of the credentials as most of the user provided credentials such as user-provided passwords which are always prone to cyberattacks. Management of the credentials without being cracked by an attacker or third party is an important concern of a user having a plurality of online accounts. As a result, various systems are available which manages the user credentials for the multiple account access using the master key concept.

One such system includes a conventional system which is available for managing the user credentials for the multiple accounts through manual intervention, wherein the user needs to remember different usernames and passwords for different online accounts. However, managing the different usernames and the passwords by the user for the different online accounts leads to one or more vulnerabilities and the user confronted with such type of problem tries to use the same password for each remote system or write down a list of passwords. Also, the user credentials which are more complex becomes difficult in remembering. In addition to, the conventional approach needs to remember the passwords used by the user for accessing different online accounts. Moreover, the credential system needs to store and manage the different usernames and the passwords for the different online accounts. Furthermore, storing the different usernames and the passwords in a particular storage format or a particular storage option might be superfluous as an attacker may get an access to passwords stored and ruin everything. Also, storing the different user credentials increases space utilisation of the storage device.

Hence, there is a need for an improved system and a method to manage user credentials for multiple-account access using a master key in order to address the aforementioned issues.

BRIEF DESCRIPTION

In accordance with one embodiment of the present disclosure, a system to manage multiple-account access using a master key is disclosed. The system includes a master key obtaining subsystem configured to obtain a master key in a predefined format. The system also includes a child key generation subsystem operatively coupled to the master key obtaining subsystem. The child key generation subsystem is configured to generate one or more child keys corresponding to one or more accounts associated with a user from the master key using a parent-child relationship function. The system also includes a password generation subsystem operatively coupled to the child key generation subsystem. The password generation subsystem is configured to generate one or more passwords regenerative in nature corresponding to the one or more child keys by using a transformation function. The system also includes a credential association subsystem operatively coupled to the password generation subsystem. The credential association subsystem is configured to associate the one or more passwords with one or more user identifiers corresponding to the one or more accounts. The system also includes a credential management subsystem operatively coupled to the credential association subsystem. The credential management subsystem is configured to enable the user to access each of the one or more accounts by using each corresponding the one or more passwords and each corresponding the one or more user identifiers.

In accordance with another embodiment of the present disclosure, a method to manage multiple-account access using a master key is disclosed. The method includes obtaining, by a master key obtaining subsystem, a master key encoded in a predefined format. The method also includes generating, by a child key generation subsystem, one or more child keys corresponding to one or more accounts associated with a user from the master key using a parent-child relationship function. The method also includes generating, by a password generation subsystem, one or more passwords regenerative in nature corresponding to the one or more child keys by using a transformation function. The method also includes associating, by a credential association subsystem, the one or more passwords with one or more user identifiers corresponding to the one or more accounts. The method also includes enabling, by a credential management subsystem, the user to access each of the one or more accounts by using each corresponding the one or more passwords and each corresponding the one or more user identifiers.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
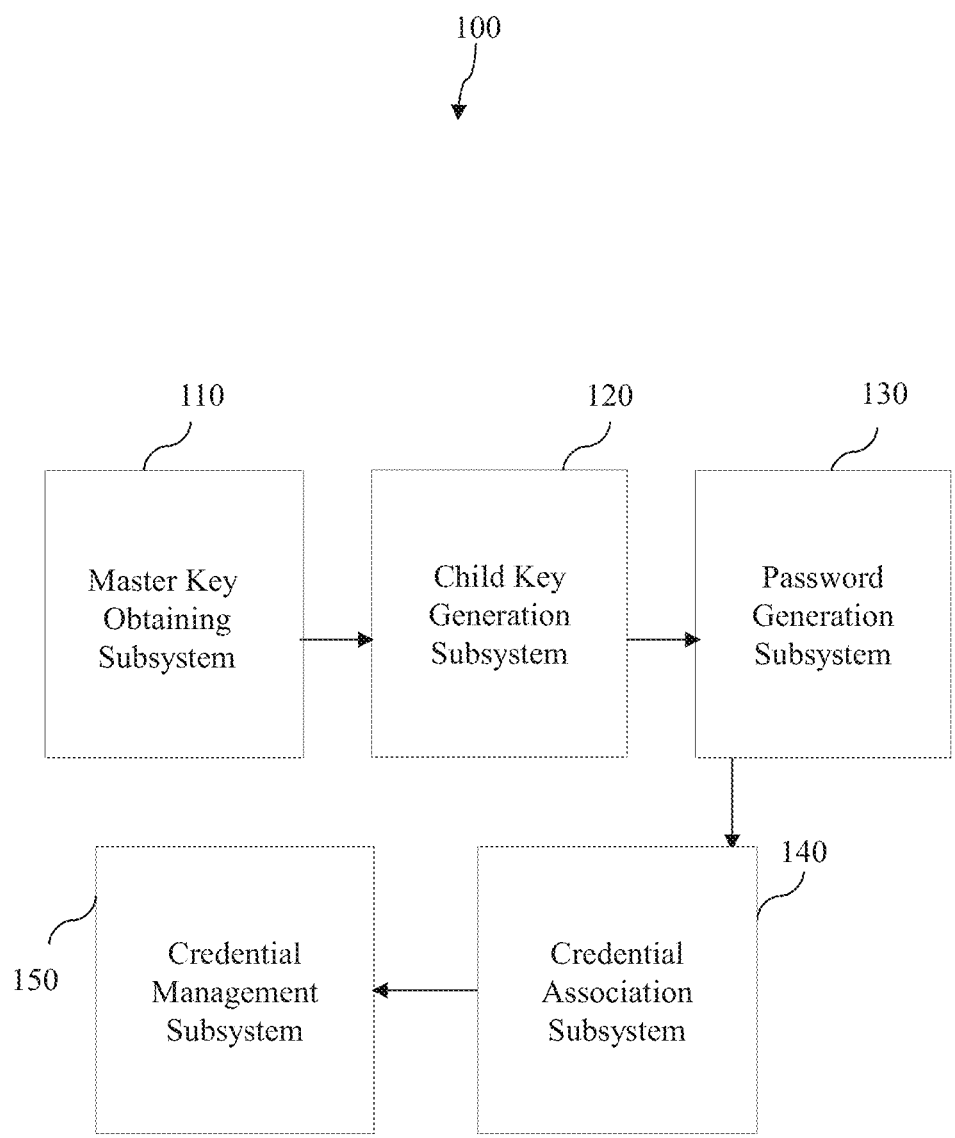
FIG. 1 is a block diagram of a system to manage multiple-account access using a master key in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method to manage multiple-account access using a master key. The system includes a master key obtaining subsystem configured to obtain a master key in a predefined format. The system also includes a child key generation subsystem operatively coupled to the master key obtaining subsystem. The child key generation subsystem is configured to generate one or more child keys corresponding to one or more accounts associated with a user from the master key using a parent-child relationship function. The system also includes a password generation subsystem operatively coupled to the child key generation subsystem. The password generation subsystem is configured to generate one or more passwords regenerative in nature corresponding to the one or more child keys by using a transformation function. The system also includes a credential association subsystem operatively coupled to the password generation subsystem. The credential association subsystem is configured to associate the one or more passwords with one or more user identifiers corresponding to the one or more accounts. The system also includes a credential management subsystem operatively coupled to the credential association subsystem. The credential management subsystem is configured to enable the user to access each of the one or more accounts by using each corresponding the one or more passwords and each corresponding the one or more user identifiers.

FIG. 1 is a block diagram of a system 100 to manage multiple-account access using a master key in accordance with an embodiment of the present disclosure. The system 100 includes a master key obtaining subsystem 110 configured to obtain a master key encoded in a predefined format. As used herein, the term 'master key' is defined as a digital parent key to access multiple online accounts by creating families of child keys. In one embodiment, the master key may include a functional representation. In such embodiment, the functional representation may include a hexadecimal representation. In some embodiment, the master key may be generated by encoding a literal key obtained from a user.

The system 100 also includes a child key generation subsystem 120 operatively coupled to the master key obtaining subsystem 110. The child key generation subsystem 120 is configured to generate one or more child keys corresponding to one or more accounts associated with a user from the master key using a parent-child relationship function. In one embodiment, the one or more child keys may include keys with a functional representation of corresponding one or more accounts associated with the user. In some embodiment, the one or more accounts may include at least one of a social media account associated with the user, a shopping account associated with the user, a bank account associated with the user, a travel organisation account associated with the user or a combination thereof. In such embodiment, the social media account may include a Facebook™ account, the shopping account may include an Amazon™ account, the bank account associated with the user may include an internet banking account, the travel organisation account associated with the user may include a Goibibo™ account or the combination thereof.

The system 100 also includes a password generation subsystem 130 operatively coupled to the child key generation subsystem 120. The password generation subsystem 130 is configured to generate one or more passwords regenerative in nature corresponding to the one or more child keys by using a transformation function. In one embodiment, the transformation function may include a function configured to modify the one or more child keys based on a predefined requirement of one or more corresponding accounts to regenerate the one or more passwords. In such embodiment, the transformation function may include at least one of a value substitution function, a swapping function, a cycling function or a combination thereof. In one embodiment, the predefined requirement to generate the one or more passwords may include a rule or a password policy to generate a strong and secured password. In such embodiment, the predefined requirement may include at least one of a minimum length of the password should be at least 8 characters long, characters of the passwords should be alphanumeric characters, password change duration should be frequent or a combination thereof. In one embodiment, the password generation subsystem 130 is configured to select a child key from the one or more child keys as a password corresponding to the one or more user accounts by using a parent-child relationship function when the user requires a new password.

The system 100 also includes a credential association subsystem 140 operatively coupled to the password generation subsystem 130. The credential association subsystem 140 is configured to associate the one or more passwords with one or more user identifiers corresponding to the one or more accounts. In one embodiment, the user identifiers may include one or more usernames corresponding to the one or more accounts.

Figure 2:
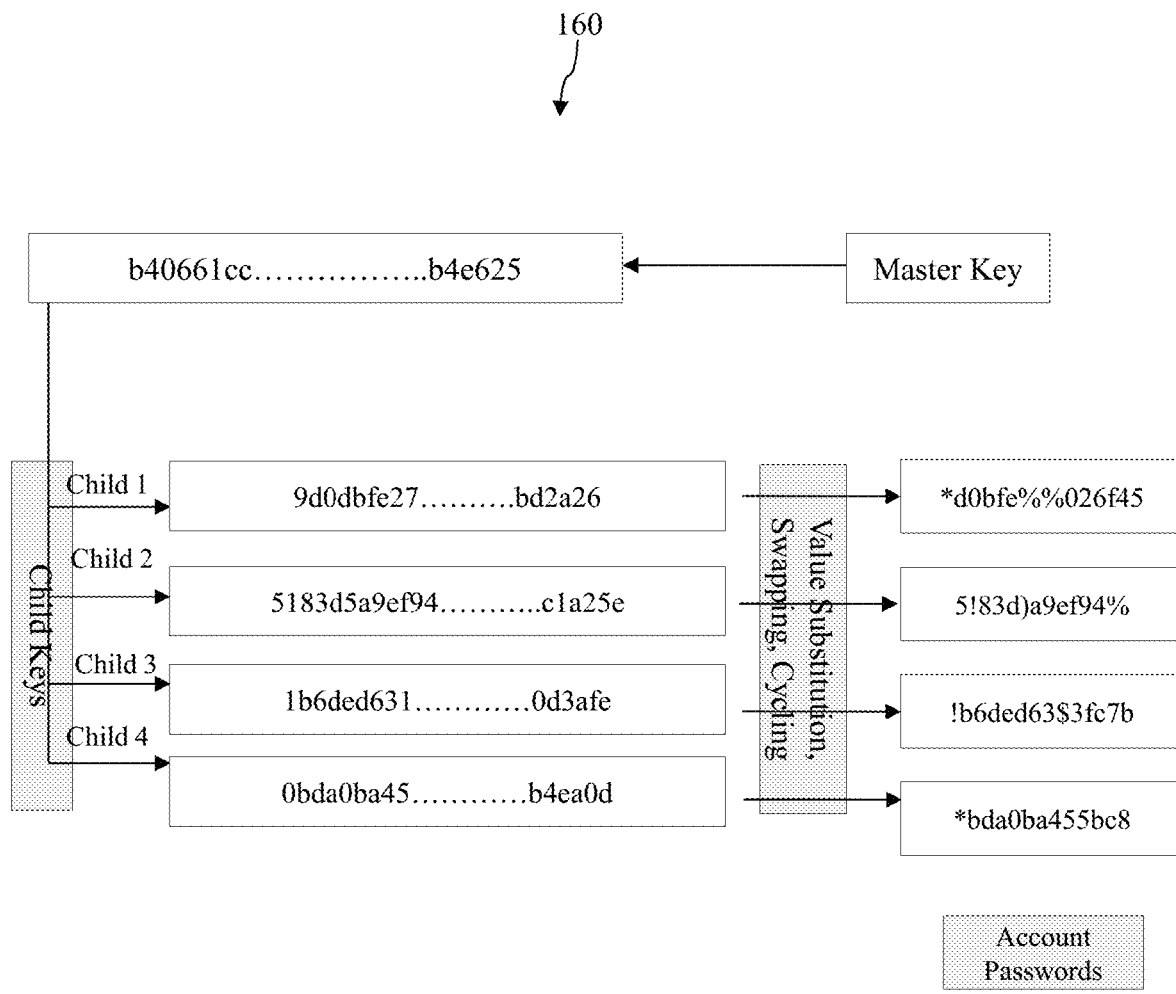
FIG. 2 depicts a block diagram of an embodiment for generating account passwords from a master key of a system to manage multiple-account access using a master key of FIG. 1 in accordance with one embodiment of the present disclosure.

In a specific embodiment, the password generation subsystem 130 may include generating only the one or more passwords corresponding to the one or more generated child keys from the generated master key as shown in 160 in FIG. 2. FIG. 2 depicts a block diagram of an embodiment for generating account passwords from a master key of a system to manage multiple-account access using a master key of FIG. 1 in accordance with the embodiment of the present disclosure.

Figure 3:
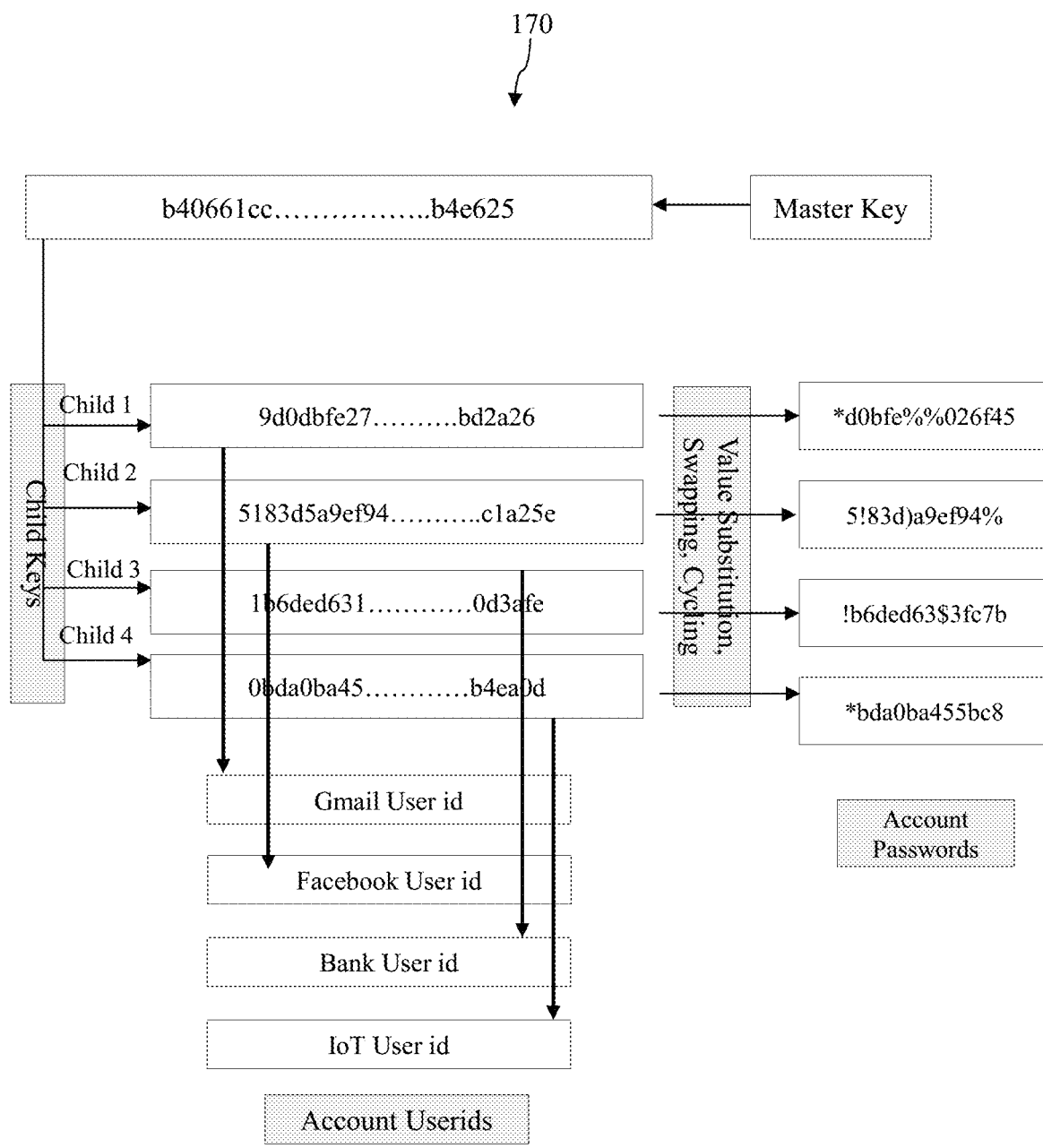
FIG. 3 depicts a block diagram of an embodiment for generating account passwords linked to a username with a master key of a system to manage multiple-account access using a master key of FIG. 1 in accordance with one embodiment of the present disclosure.

In another embodiment, the one or more passwords generated by the password generation subsystem 130 are further associated with the one or more user identifiers corresponding to the one or more accounts as shown in 170 in FIG. 3. FIG. 3 depicts a block diagram of an embodiment for generating account passwords linked to a username with a master key of a system to manage multiple-account access using a master key of FIG. 1.

Figure 4:
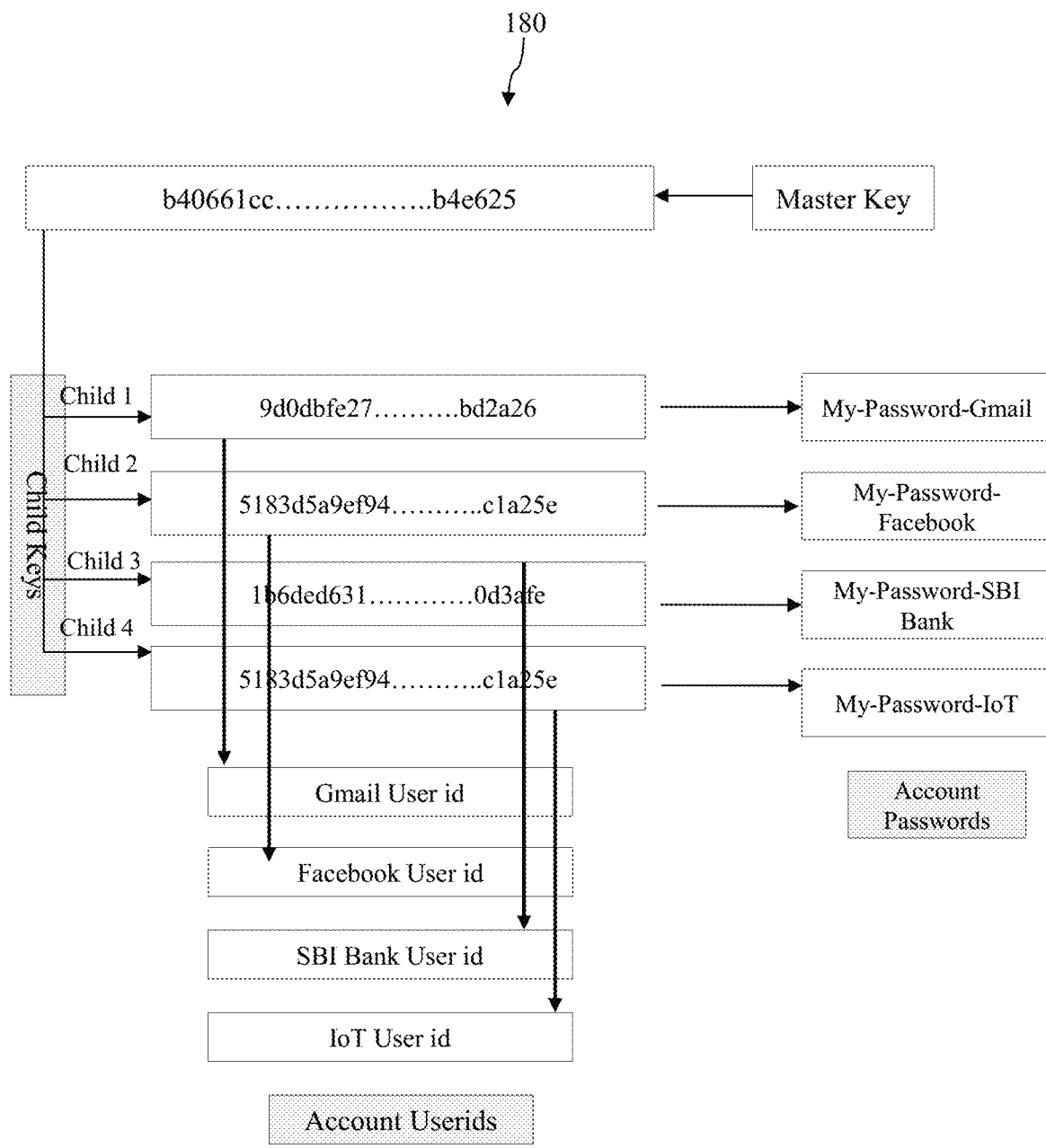
FIG. 4 depicts a block diagram of an embodiment for generating user Ids and linking user-defined passwords and user IDs with a master key of a system to manage multiple-account access using a master key of FIG. 1 in accordance with one embodiment of the present disclosure.

In yet another embodiment, the credential association subsystem 140 is further configured to associate one or more user-defined passwords with the one or more associated user identifiers corresponding to the one or more accounts when the one or more user defined passwords are unaltered using the second function as shown in 180 in FIG. 4. FIG. 4 depicts a block diagram of an embodiment for generating user Ids and linking user-defined passwords and user IDs with the master key of a system to manage multiple-account access using a master key of FIG. 1. In such embodiment, the one or more user defined passwords and the one or more associated user identifiers are linked with the generated master key.

Referring back to FIG. 1, the system 100 also includes a credential management subsystem 150 operatively coupled to the credential association subsystem 140. The credential management subsystem 150 is configured to enable the user to access each of the one or more accounts by using each corresponding the one or more passwords and each corresponding the one or more user identifiers. The credential management subsystem 150 stores only details of one or more transformations which are performed to create the one or more passwords by generating the keys dynamically when the user requires machine generated passwords. As a result, as the one or more passwords are not stored by the credential management subsystem 150, the one or more passwords may not be hacked. Also, data storage required by the credential management subsystem 150 is much less as the one or more passwords are not stored. However, storing of the one or more passwords corresponding to the one or more accounts is necessary if the user wants to select a literal password that cannot be generated automatically. The one or more generated passwords are stored with the same account-password parent-child relationship-based link. The master key, we get account id's, and for that account id, we store a literal password which is linked to this password. The parent-child relationship link is not stored as such link is generated with the parent-child relationship function every time.

Figure 5:
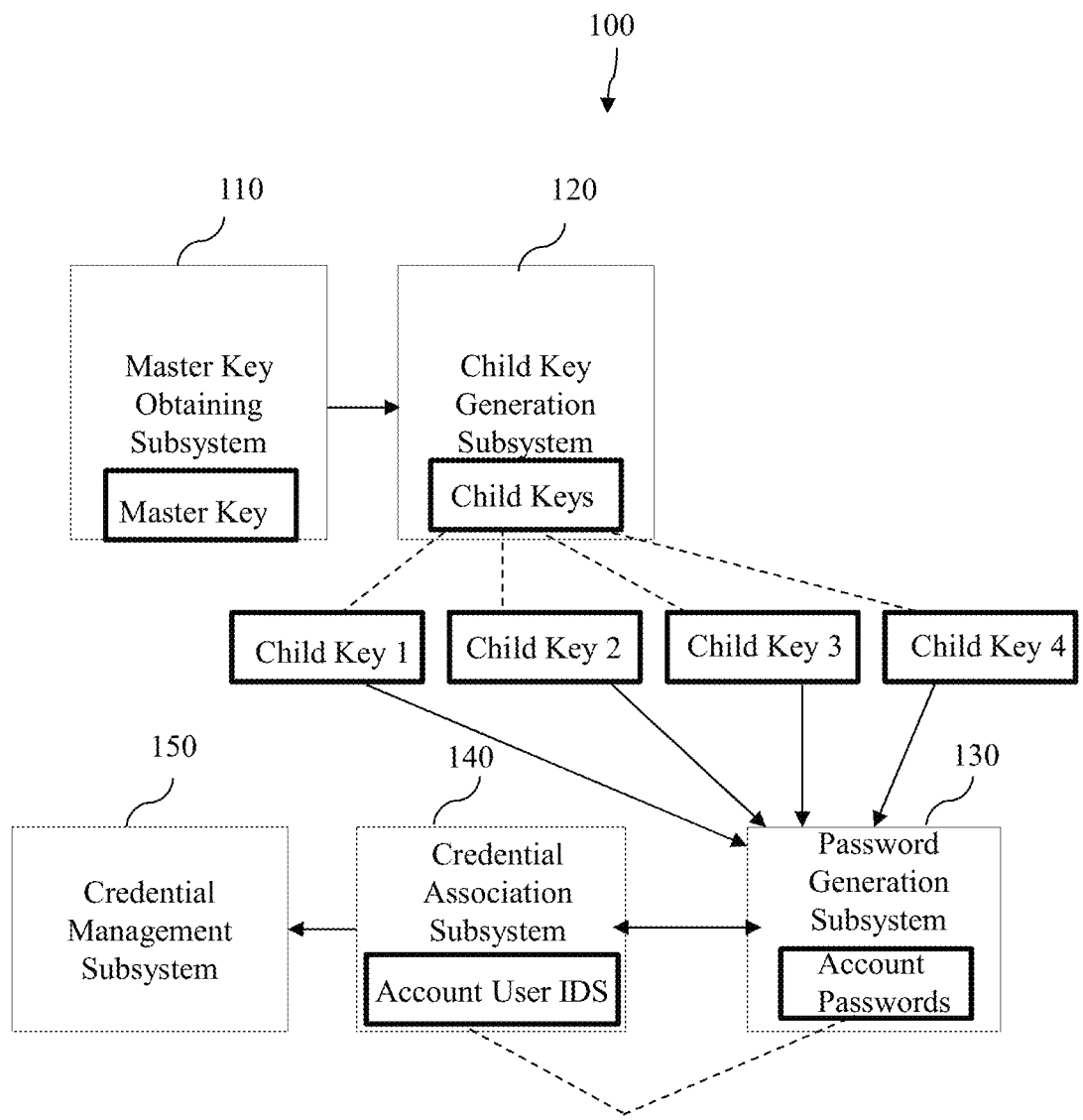
FIG. 5 is a schematic representation of an exemplary embodiment of a system multiple-account access using a master key of FIG. 1 in accordance with the embodiment of the present disclosure.

FIG. 5 is a schematic representation of an exemplary embodiment of a system to manage multiple-account access using a master key of FIG. 1 in accordance with the embodiment of the present disclosure. A problem of authenticating a user to a plurality of remote systems has become particularly evident in light of a development of limited access sites on the World Wide Web (WWW). Before accessing a site, the user is presented with an authentication form generated by his or her browser requesting a user identifier (user ID) and a password. Here, the user needs to register separately with each such site and maintain multiple passwords. Furthermore, when navigating through the WWW, the user is frequently interrupted by authentication messages requesting a user ID and password. Maintaining the multiple passwords is a tedious as well as a challenging task and sometimes may cause problem in accessing multiple accounts by the user if not remembered.

The system 100 provides a solution for the problem of remembering the user IDs and the passwords by the user with a help of a generation of a master key. For example, suppose the user has one or more online accounts such as a Facebook account, a Gmail account, an internet banking account of State Bank of India (SBI) and an IoT devices access account. Now, after registration with such one or more accounts, let us assume, the user forgets each corresponding one or more passwords and each corresponding user IDs. In such a scenario, the master key helps in deducing the corresponding one or more user IDs, corresponding one or more passwords and other authentication and authorization information for accessing the one or more online accounts.

A master key obtaining subsystem 110 obtains a master key encoded in a predefined format. The master key is a functional representation in a predefined format. For example, here the master key, which is obtained, is represented as 'b40661cc . . . b4e625' as shown in FIG. 3. FIG. 3 depicts a schematic representation of an embodiment for generating account passwords linked to a username with a master key of a system to manage multiple-account access using a master key of FIG. 1.

Referring to FIG. 5, once, the master key is obtained, one or more child keys corresponding to one or more accounts associated with a user are generated in real-time by a child key generation subsystem 120. For example, the one or more child keys corresponding to the at least one of the Facebook account, the Gmail account, the internet banking account of State Bank of India (SBI) and the IoT account associated with the user includes a mathematical representation which is generated hierarchically by using a parent-child relationship function in the real-time. For example, the one or more child keys such as a child key 1 '9d0dbfe27 . . . bd2a26' for the Gmail account, a child key 2 '5183d5a9ef94 . . . c1a25e' for the Facebook account, a child key 3 '1b6ded631 . . . 0d3afe' for the internet banking account of the SBI and a child key 4 '0bda0ba45 . . . b4ea0d' for the IoT usage is shown in FIG. 3.

Referring back to FIG. 5, from the one or more generated child keys, one or more corresponding passwords regenerative in nature are generated by a password generation subsystem 130 using a transformation function. Here, the transformation function includes a function to modify the one or more generated child keys based on a predefined requirement of one or more corresponding accounts to generate the one or more regenerative passwords. For example, the transformation function may include at least one of a value substitution function, a swapping function, a cycling function or a combination thereof. The predefined requirement varies for the one or more corresponding accounts. Suppose, let's say the predefined requirement to generate the one or more passwords for the Gmail account includes a strong and secured password of a minimum length of at least 8 characters long, characters of the passwords should be alphanumeric characters, at least one special character, password change duration should be frequent, a security question or a combination thereof. So, the password generated based on the predefined requirement for the Gmail account may include '*d0bfe%%026f45' as shown in FIG. 3. Similarly, other passwords corresponding to the Facebook account, the internet banking account and the IoT usage are also depicted in FIG. 3.

With continued reference to FIG. 5, once, the one or more passwords which are regenerative in nature are generated, such one or more generated passwords are associated with each one or more user identifiers corresponding to the one or more accounts by a credential association subsystem 140. Here, the one or more generated regenerative passwords are linked with the corresponding one or more child keys corresponding to the one or more accounts to enable access of the each of the one or more accounts by the user. Later, such each one or more associated user identifiers and each corresponding one or more generated passwords are managed by a credential management subsystem 150 without need of storing the one or more generated passwords. Also, data storage required by the credential management subsystem 150 is much less as the one or more passwords are not stored. As a result, the problem of the user in remembering the each corresponding one or more user identifiers and the each corresponding one or more passwords for accessing the each of the one or more accounts gets resolved with the help of a single obtained master key.

Figure 6:
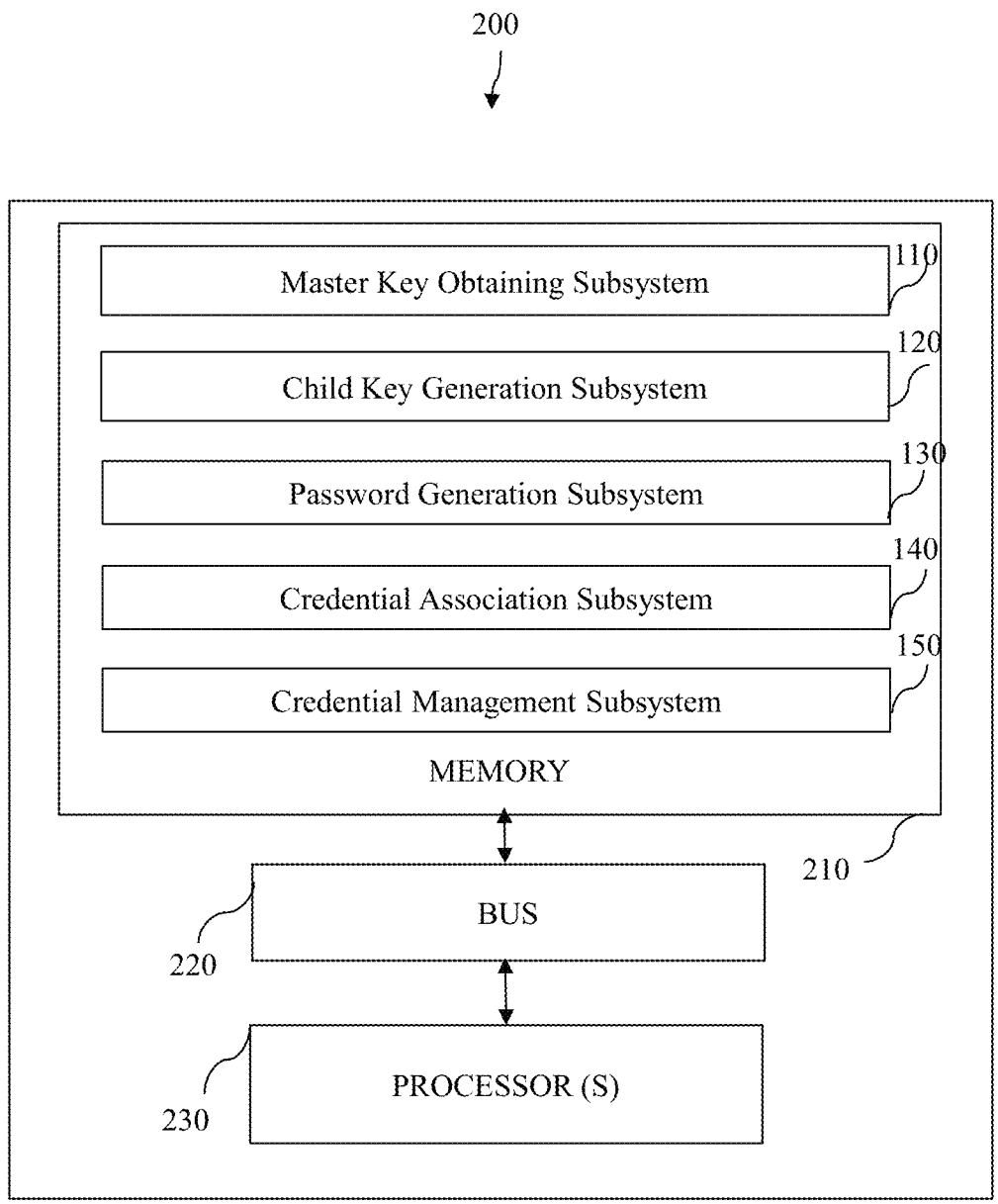
FIG. 6 is a block diagram of a computer or a server in accordance with an embodiment of the present disclosure.

FIG. 6 is a block diagram of a computer or a server in accordance with an embodiment of the present disclosure. The server 200 includes processor(s) 230, and memory 210 operatively coupled to the bus 220.

The processor(s) 230, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 210 includes a plurality of subsystems stored in the form of executable program which instructs the processor 230 to perform the method steps illustrated in FIG. 1. The memory 210 is substantially similar to the system 100 of FIG. 1. The memory 210 has following subsystems: a master key obtaining subsystem 110, a child key generation subsystem 120, a password generation subsystem 130, a credential association subsystem 140 and a credential management subsystem 150.

The master key obtaining subsystem 110 is configured to obtain a master key encoded in a predefined format. The child key generation subsystem 120 is configured to generate one or more child keys corresponding to one or more accounts associated with a user from the master key using a parent-child relationship function. The password generation subsystem 130 is configured to generate one or more passwords regenerative in nature corresponding to the one or more child keys by using a transformation function. The credential association subsystem 140 is configured to associate the one or more passwords with one or more user identifiers corresponding to the one or more accounts. The credential management subsystem 150 is configured to enable the user to access each of the one or more accounts by using each corresponding the one or more passwords and each corresponding the one or more user identifiers.

Figure 7:
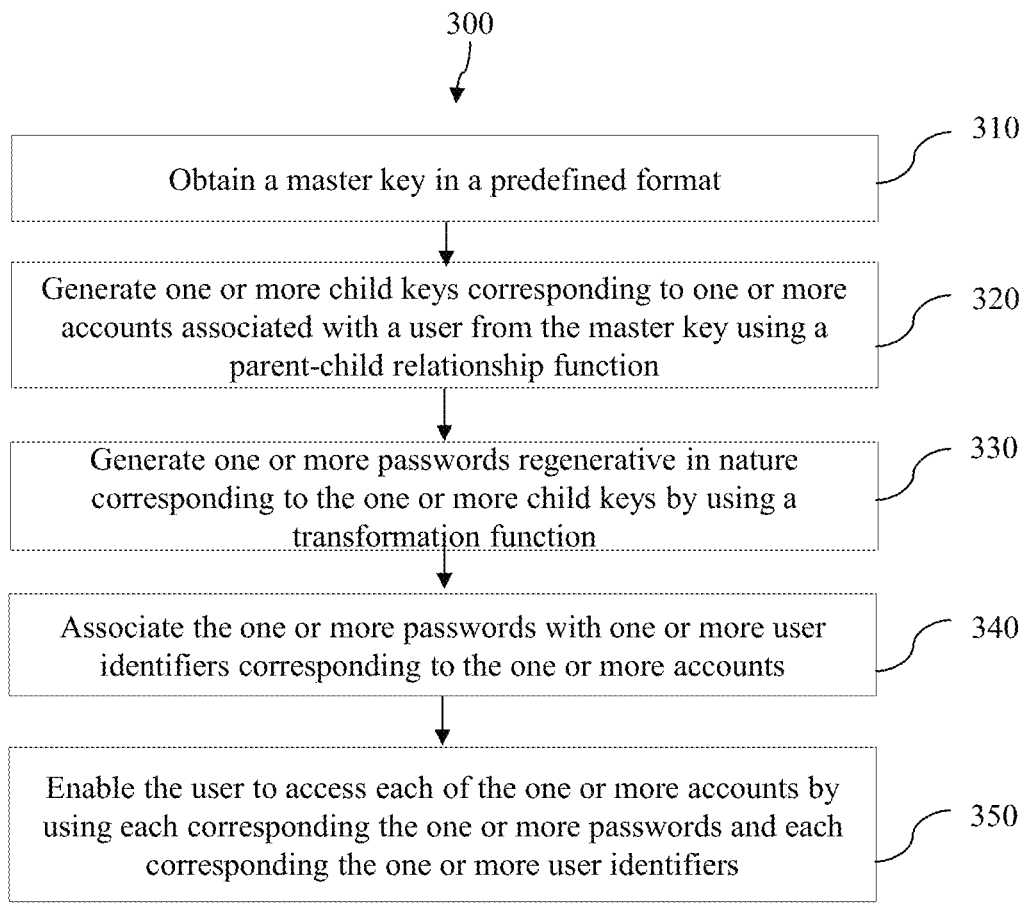
FIG. 7 is a flowchart representing the steps involved in a method multiple-account access using a master key of FIG. 1 in accordance with an embodiment of the present disclosure.

FIG. 7 is a flowchart representing the steps involved in a method 300 for multiple-account access using a master key of FIG. 1 in accordance with an embodiment of the present disclosure. The method 300 includes obtaining, by a master key obtaining subsystem, a master key encoded in a predefined format in step 310. In one embodiment, obtaining the master key encoded in the predefined format may include obtaining the master key as a functional representation of the predefined format.

The method 300 also includes generating, by a child key generation subsystem, one or more child keys corresponding to one or more accounts associated with a user from the master key using a parent-child relationship function in step 320. In one embodiment, generating the one or more child keys corresponding to the one or more accounts associated with the user may include generating the one or more child keys corresponding to at least one of a social media account associated with the user, a shopping account associated with the user, a bank account associated with the user, a travel organisation account associated with the user or a combination thereof.

The method 300 also includes generating, by a password generation subsystem, one or more passwords regenerative in nature corresponding to the one or more child keys by using a transformation function in step 330. In one embodiment, generating the one or more passwords regenerative in the nature corresponding to the one or more child keys may include generating the one or more passwords based on a predefined requirement of one or more corresponding accounts to regenerate the one or more passwords. In some embodiment, generating the one or more passwords corresponding to the child keys may include generating the one or more passwords by using at least one of a value substitution function, a swapping function, a cycling function or a combination thereof.

The method 300 also includes associating, by a credential association subsystem, the one or more passwords with one or more user identifiers corresponding to the one or more accounts in step 340. In one embodiment, associating the one or more passwords with the one or more user identifiers may include associating the one or more regenerated passwords with one or more usernames corresponding to the one or more accounts associated with the user.

The method 300 also includes enabling, by a credential management subsystem, the user to access each of the one or more accounts by using each corresponding the one or more passwords and each corresponding the one or more user identifiers in step 350. In one embodiment, enabling the user to access each of the one or more accounts may include enabling the user to login the account by using the each corresponding one or more regenerated passwords and the each corresponding one or more associated user identifiers.

In a preferred embodiment, the method further includes associating, by the credential association subsystem, one or more user-defined passwords with the one or more associated user identifiers corresponding to the one or more accounts when the one or more user defined passwords are unaltered using the transformation function.

Various embodiments of the present disclosure enable easy access of the multiple accounts associated with the user through a single master key without using separate passwords for each account.

Moreover, the present disclosed system derives one or more child keys from a generated master key in real-time and omits necessity of storing and remembering the passwords for accessing the one or more accounts.

Furthermore, the present disclosed system makes system of accessing the accounts more secured as the corresponding passwords for each account are generated from the one or more corresponding child keys and as a result it becomes difficult by the user to guess or crack the one or more generated passwords.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A system to manage multiple account access using a master key, comprising:
    a hardware processor; and
    a memory coupled to the hardware processor, wherein the memory comprises a se of program instructions in form of a plurality of subsystems, configured to be executed by the hardware processor, wherein the plurality of subsystems comprises:
        a master key obtaining subsystem configured to obtain a master key in a predefined format;
        a child key generation subsystem operatively coupled to the master key obtaining subsystem, wherein the child key generation subsystem is configured to generate one or more child keys corresponding to one or more accounts associated with a user from the master key using a parent-child relationship function;
        a password generation subsystem operatively coupled to the child key generation subsystem, wherein the password generation subsystem is configured to generate one or more passwords regenerative in nature corresponding to the one or more child keys by a transformation function,
            wherein the transformation function is configured to modify the one or more child keys based on a predefined requirement of the corresponding one or more accounts to regenerate the one or more passwords, wherein the transformation function comprises at least one of: a value substitution function, a swapping function, and a cycling function, and wherein the predefined requirement corresponding to the one or more accounts comprises at least one of: a rule and a password policy to generate the one or more passwords;
        a credential association subsystem operatively coupled to the password generation subsystem, wherein the credential association subsystem is configured to associate the one or more passwords with one or more user identifiers corresponding to the one or more accounts; and
        a credential management subsystem operatively coupled to the credential association subsystem, wherein the credential management subsystem is configured to enable the user to access each of the one or more accounts by each of the corresponding one or more passwords and each of the corresponding one or more user identifiers.

2. The system as claimed in claim 1, wherein the master key obtaining subsystem is configured to obtain the master key by encoding a literal key.

3. The system as claimed in claim 1, wherein the one or more accounts comprises at least one of: a social media account associated with the user, a. shopping account associated with the user, a bank account associated with the user, a travel organisation account associated with the user or a combination thereof.

4. The system as claimed in claim 1, wherein the password generation subsystem is configured to select a child key from the one or more child keys as a password corresponding to the one or more user accounts by the parent-child relationship function when the user requires a new password.

5. The system as claimed in claim 1, wherein the credential association subsystem is configured to associate one or more user-defined passwords with the one or more associated user identifiers corresponding to the one or more accounts when the one or more user-defined passwords are unaltered using the trasformation function.

6. The system as claimed in claim 1, wherein the credential management system is further configured to store details of one or more transformations performed by the transformation function for generating the one or more passwords.

7. A method to manage multiple account access using a master key, comprising:
    obtaining, by a hardware processor, a master key encoded in a predefined format;
    generating, by the hardware processor, one or more child keys corresponding to one or more accounts associated with a user from the master key using a parent-child relationship function;

generating, by the hardware processor, one or more passwords regenerative in nature corresponding to the one or more child keys by a transformation function,
   wherein the transformation function is configured to modify the one or more child keys based on a predefined requirement of the corresponding one or more accounts to regenerate the one or more passwords, wherein the transfounation function comprises at least one of a value substitution function, a swapping function, and a cycling function, and wherein the predefined requirement corresponding to the one or more accounts to regenerate the one or more passwords comprises at least one of: a rule and a password policy to generate the one or more passwords;
associating, by the hardware processor, the one or more passwords with one or more user identifiers corresponding to the one or more accounts: and
enabling, by the hardware processor, the user to access each of the one or more accounts by each of the corresponding one or more passwords and each of the corresponding one or more user identifiers.

8. The method as claimed in claim 7, further comprising associating, by the hardware processor, one or more user-defined passwords with the one or more associated user identifiers corresponding to the one or more accounts when the one or more user-defined passwords are unaltered using the transformation function.

\* \* \* \* \*